United States Patent [19]

Karr et al.

[11] 4,371,945
[45] Feb. 1, 1983

[54] ELECTRONIC PEDOMETER

[75] Inventors: Lawrence J. Karr, 220 Horizon St., Venice, Calif. 90291; Gary L. Wasserman, 2669 Rambla Pacifico, Malibu, Calif. 90265; George R. Boehme, Venice, Calif.

[73] Assignees: Lawrence Joseph Karr; Gary Lee Wasserman, both of Marine del Rey, Calif.

[21] Appl. No.: 211,684

[22] Filed: Dec. 1, 1980

[51] Int. Cl.³ .............................................. G01C 22/00
[52] U.S. Cl. .................... 364/561; 364/410; 235/92 DN; 235/105; 340/323 R
[58] Field of Search ............ 272/70, 73, 100, DIG. 6; 364/413, 560, 561, 565, 410; 367/99; 235/92 DN, 92 MT, 92 PE, 92 CP, 105; 340/323 R

[56] References Cited

U.S. PATENT DOCUMENTS

| | | | |
|---|---|---|---|
| 3,492,582 | 1/1970 | Heywood | 340/323 R |
| 4,049,954 | 9/1977 | Da Costa Vieira et al. | 364/560 |
| 4,053,755 | 10/1977 | Sherrill | 235/92 DN |
| 4,220,996 | 9/1980 | Searcy | 364/561 |
| 4,223,211 | 9/1980 | Allsen et al. | 235/92 DN |
| 4,283,712 | 8/1981 | Goody | 340/323 R |
| 4,285,041 | 8/1981 | Smith | 235/105 |

*Primary Examiner*—Gary Chin
*Attorney, Agent, or Firm*—Reagin & King

[57] ABSTRACT

A pedometer is disclosed which calculates the distance a user walks, jogs or runs by electronically measuring the length of each stride taken by the user. Stride length is measured using ultrasonic waves. The pedometer comprises an ultrasonic generator module which is strapped to one leg of the user. An ultrasonic detector module is strapped to the other leg of the user. The generator module emits pulses of ultrasonic energy which are detected by the detector module. A processor and display module in the form of a wristwatch is also provided. The processor module is used to calculate stride length based on the speed of sound and the time delay between pulses emitted and detected by the leg-mounted modules. The pedometer is capable of displaying on a digital display the distance traveled, time per unit distance, elapsed time and time of day. The pedometer is also programmed to compensate for a variety of measurement errors.

15 Claims, 12 Drawing Figures

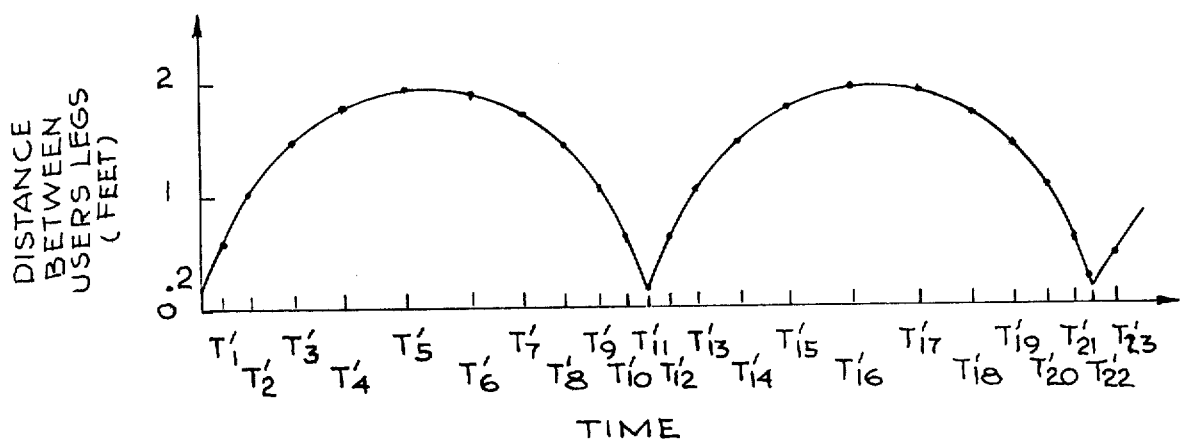
Fig. 6
| PULSE | TIME (SEC) | PULSE | TIME (SEC) | PULSE | TIME (SEC) |
|---|---|---|---|---|---|
| $T'_1$ = | .03045 | $T'_9$ = | .27090 | $T'_{17}$ = | .51168 |
| $T'_2$ = | .06090 | $T'_{10}$ = | .30045 | $T'_{18}$ = | .54144 |
| $T'_3$ = | .09126 | $T'_{11}$ = | .33000 | $T'_{19}$ = | .57117 |
| $T'_4$ = | .12153 | $T'_{12}$ = | .36045 | $T'_{20}$ = | .60090 |
| $T'_5$ = | .15182 | $T'_{13}$ = | .39090 | $T'_{21}$ = | .63054 |
| $T'_6$ = | .18171 | $T'_{14}$ = | .42126 | $T'_{22}$ = | .66009 |
| $T'_7$ = | .21144 | $T'_{15}$ = | .45153 | $T'_{23}$ = | .69045 |
| $T'_8$ = | .24126 | $T'_{16}$ = | .48171 | | |
Fig. 7
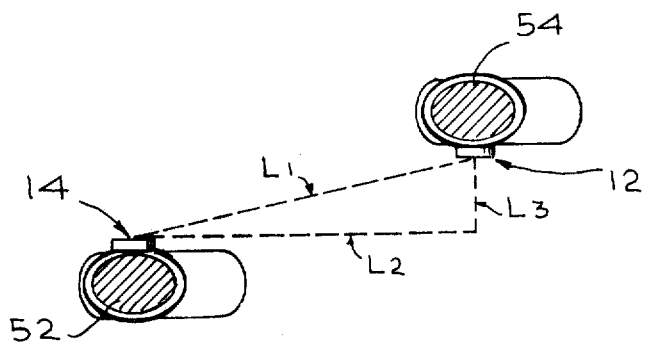
Fig. 8

ELECTRONIC PEDOMETER

BACKGROUND OF THE INVENTION

This invention relates to pedometers and, more particularly, to pedometers that determine the distance a user walks, jogs or runs by electronically measuring the length of strides taken by the user.

Pedometers have been used for many years by hikers and long distance walkers to measure the distance traversed. More recently there has been a resurgence in interest in these devices for use in the popular sports of jogging and distance running. In these types of sports, a measure of the athlete's level of achievement requires an accurate determination of distance traversed as well as elapsed time. With the advent of digital stop watches, accurate measurement of elapsed time over a particular course is readily achieved. When the variables of both distance and time are made available to the user, the user's speed may be computed. This information can then be used to pace the user and to evaluate progress in an exercise program or sporting event.

A pedometer for use in the above mentioned sports is one which can accurately measure the distance traversed under a number of varying conditions. For example, the pattern of a jogger may involve activity from slow walking to rapid jogging. A typical jogging path may include hills and winding paths. In the case of a marathon runner, activity may include motion from jogging to sprinting. At high running speeds both of the user's feet may be clear of the ground at the same time. A pedometer suitable for use during these activities must operate accurately over this wide range of conditions.

Many prior art pedometers have been developed which indirectly measure the distance traversed by the user by counting the number of steps taken. The operation of these prior art devices is based on the assumption that the user's stride or distance traversed per step is a constant. The total distance traversed by the user is computed by counting the number of steps taken and multiplying this number by a constant stride distance.

Prior art pedometers employ a variety of techniques for counting the number of steps taken. Most of these techniques rely on the fact that the user's body undergoes an abrupt change in acceleration each time the user's foot contacts the ground. This change in acceleration is detected by any one of a number of acceleration sensitive devices. One of the more common techniques employed in the prior art pedometers is the use of a spring-mounted weight which is coupled to a mechanical counter. At each step, the abrupt change in acceleration causes the weight to exert a force on the spring. This spring force is, in turn, used to advance the counter.

The prior art pedometers possess several limitations which preclude their widespread use in athletic activities such as described above. For example, the assumption that stride length is a constant results in large errors in distance measurement. It has been found that actual stride length may vary considerably as a function of terrain and running speed. Another disadvantage of the prior art pedometers is that the mechanical means for sensing and counting steps has proven unreliable under the varied conditions mentioned above. In many cases the prior art devices with either fail to record a step or, conversely, will record an excessive number of steps.

Further, since many prior art pedometers display only the number of steps taken, the user must mentally convert this data into distance and rate of speed. This presents an unwieldly procedure for a user attempting to determine instantaneous data while running. This condition is further aggravated by the fact that most of the prior art pedometers are designed to be waist-mounted for proper acceleration sensing. When mounted in this position it is difficult, if not, impossible to see the pedometer display while running. The above limitations of the prior art pedometers are even more pronounced when the user is attempting to measure distance traversed during active sports such as tennis, handball and the like.

Accordingly, it is an object of the present invention to provide a new and improved pedometer.

It is another object of the present invention to provide a new and improved pedometer which measures the length of each stride taken by the user.

It is still another object of the present invention to provide a pedometer which measures stride length by electronic means.

It is still another object of the present invention to provide a pedometer which calculates and displays total distance traversed, elapsed time and speed on a wrist-mounted display unit.

SUMMARY OF THE INVENTION

The foregoing and other objects of the invention are accomplished by an electronic pedometer which measures stride length by electronic means. The pedometer also sums the individual stride lengths, compensates for measurement errors and displays total distance traversed.

In the preferred embodiment, stride length is measured indirectly by means of acoustic waves. This concept uses the relatively constant velocity of sound to convert a time delay measurement into a distance measurement. The electronic pedometer of the present invention includes three components.

The first component is a leg-mounted battery operated ultrasonic generator module. The generator module includes an ultrasonic transducer for emitting ultrasonic energy. The transducer is in turn driven by an ultrasonic oscillator which is keyed to produce a continuous train of narrow pulses of ultrasonic energy at a fixed repetition rate. The frequency, pulse width and repetition rate of the ultrasonic pulses are all synchronized by a crystal controlled time base also located within the generator module. The generator module is designed to be strapped to one of the user's legs so that the ultrasonic transducer faces the opposing leg.

The second component of the electronic pedometer is a leg-mounted battery operated ultrasonic detector module. The detector module includes an ultrasonic microphone for detecting the ultrasonic energy emitted from the generator module. The microphone output signal is in turn amplified and filtered to produce a detection signal in response to the output of the ultrasonic generator. The detection signal is transmitted via a high frequency radio transmitter and antenna to the third component of the pedometer as described below. In a manner analogous to the ultrasonic generator module, the ultrasonic detector module is strapped to the user's other leg so that the microphone faces the transducer on the opposing leg.

The third component of the electronic pedometer of the present invention is a battery operated wrist-mounted processor and display module. This unit includes a high frequency radio receiver tuned to receive the RF output signal of the transmitter located in the detector module. The output signal from the receiver is a reproduction of the detection signal from the detector module. This detection signal is in turn connected to an input terminal of a microprocessor. The microprocessor is programmed to perform all of the necessary logic and arithmetic operations to convert the detection signal into a distance measurement. Both the receiver and microprocessor are synchronized by a crystal controlled time base. The time base is also used by the microprocessor to calculate elapsed time and time of day.

Output signals from the microprocessor are displayed on a multi-digit digital display. The display is mounted within a wrist-mounted housing in a configuration similar to that of a digital wristwatch. Pushbutton operated switches are provided to start, stop and reset the accumulation of time and distance data. The switches also enable the display to show time of day, elapsed time, distance in miles or kilometers and time per unit distance. The operation of the electronic pedometer of the present invention is as follows.

The user straps the generator and detector modules to each leg so that the ultrasonic transducer and microphone face each other when the legs are adjacent each other. The processor and display module is wrist mounted. The leg-mounted modules are energized by actuating their individual power switches. The pedometer of the present invention measures distance by detecting the time delay between the time the generator module emits a pulse of ultrasonic energy and the time this energy is detected by the detector module. Since the speed of sound is constant for constant temperature, the above described time delay is proportional to the distance between the generator and detector modules.

The microprocessor is programmed to automatically synchronize a logic signal to coincide with the occurrence of the pulses of ultrasonic energy emitted from the generator module. This synchronization is possible because both the microprocessor and the generator module are individually controlled by matched crystal controlled time bases. When the microprocessor is properly synchronized, it calculates the time delay between the generation of the ultrasonic pulses and the detection of these pulses. As described above, this time delay represents the distance between the user's feet. The microprocessor converts the time delay data into signals which represent the stride distance of the user for each step taken.

The microprocessor is also programmed to compensate for a variety of errors in the measurement of distance traversed. For example, the microprocessor compensates for the variations of the speed of sound as a function of ambient temperature. The processor also includes an algorithm for leaping. This algorithm is based on the fact that a runner will have a tendency to take leaping steps in which both feet are clear of the ground. Under these conditions, the distance traversed by the runner exceeds his stride length. The processor determines a leaping compensation factor as a function of runner velocity and stride frequency and adjusts the distance calculation accordingly. The processor can also compute and display time per unit of distance and elapsed time.

These and other objects, features and advantages of the invention will become apparent from a reading of the specification when taken in conjunction with the drawings in which like reference numerals refer to like elements in the several figures.

BRIEF DESCRIPTION OF THE DRAWINGS

FIG. 6 is a graphic example of the distance between the feet of a user as a function of time;

FIG. 7 is a table listing the time of detection of the ultrasonic pulses by the detection module for the example of FIG. 6;

FIG. 8 is a cross-sectional view of the legs of the user of FIG. 2 showing the leg interstices.

DESCRIPTION OF THE PREFERRED EMBODIMENT

Figure 1:
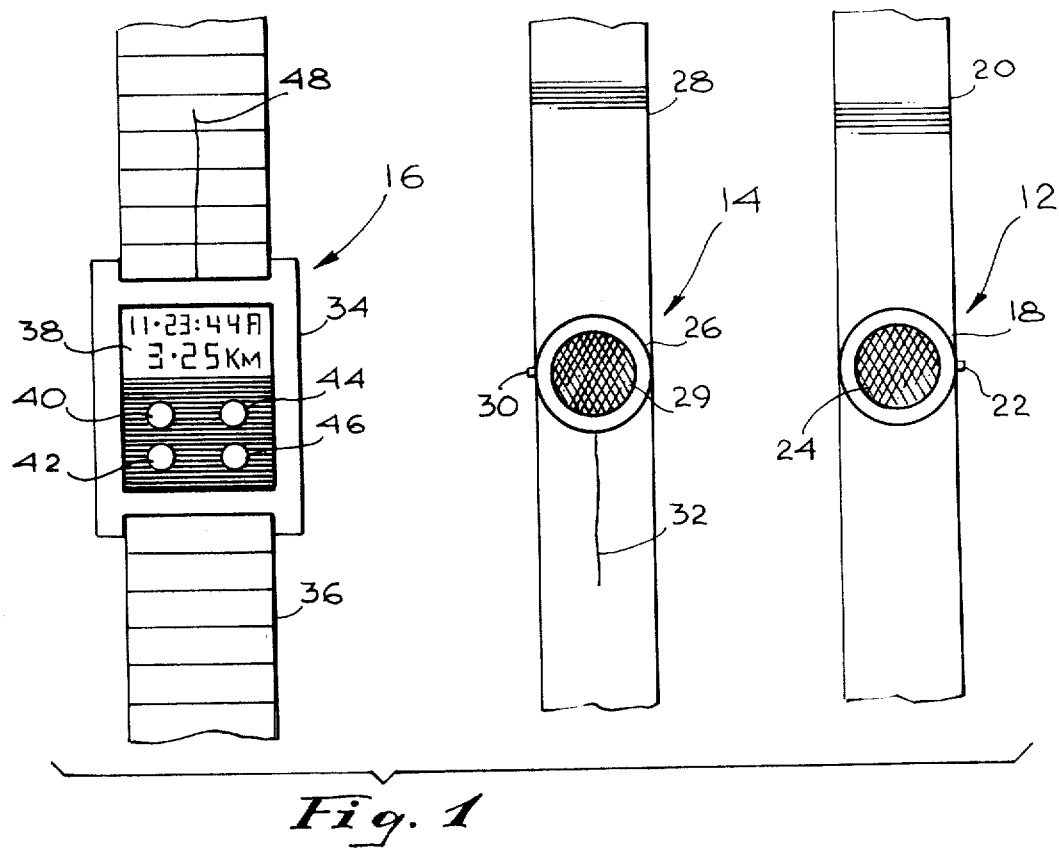
FIG. 1 is a perspective view showing the various components of the electronic pedometer of the present invention.

Referring to FIG. 1 there is shown a perspective view of the generator module 12, the detector module 14 and the processor and display module 16 of electronic pedometer of the present invention. The ultrasonic generator module 12 includes a housing 18 which may be formed of plastic and which is fastened to an adjustable leg strap 20. The strap 20 is designed to permit the module 12 to be mounted to the leg of the user of the electronic pedometer and may be formed of an elastic material having an adjustable fastening means such as Velcro. The plastic housing 18 contains electronic circuitry, an ultrasonic transducer and a battery power source which form the components of the generator module 12 described hereinafter. A power switch 22 is also provided to connect the battery power source to the electronic circuitry of the module 12. The ultrasonic transducer may be in the form of a capacitive or piezoelectric disk. This disk is mounted within the housing 18 in a manner which permits the ultrasonic energy to be emitted in a direction opposite to the side of the housing 18 which is mounted to the strap 20. The transducer is in turn covered by a screen or mesh 24 which serves to protect the transducer from dust and mechanical impact.

Similarly, the ultrasonic detector module 14 consists of a plastic housing 26 which is fastened to an adjustable leg strap 28. The leg strap 28 is similar in form to the leg strap 20 of the module 12. The housing 26 of the module 14 contains electronic circuitry, an ultrasonic microphone and a battery power source which form the components of the ultrasonic detector module 14 as described hereinafter. The ultrasonic microphone may be in the form of a capacitive or piezoelectric disk. In a manner similar to the construction of the module 12, this disk is mounted within the housing 26 in a manner which permits detection of ultrasonic energy from a direction opposite to the side of the housing 26 which is mounted to the strap 28. The ultrasonic microphone is protected by a mesh or screen 29. A power switch 30 is provided to energize the electronics within the module 14. Included as part of the ultrasonic detector module 14 is a VHF antenna 32 which is embedded in the leg strap 28.

Also shown in FIG. 1 is the processor and display module 16. The module 16 includes a housing 34 which may be formed of plastic or metal. The housing 34 is fastened to an adjustable wrist strap 36. Mounted within the housing 34 are a digital display 38 and pushbutton actuated switches 40, 42, 44 and 46. Also located within the housing 34 are electronic components used for calculating and displaying the output data of the electronic pedometer, a battery power source for energizing the electronics of the module 16 and a speaker for generating a variety of audio tones. A VHF antenna 48 is provided which is positioned within the adjustable wristband 36. From the above description of the module 16, it can be seen that the form of the module 16 resembles that of a digital wristwatch. It is contemplated that fabrication methods similar to those for producing digital wristwatches will be used to construct the module 16. These fabrication processes are well known to those skilled in the art.

The display 38 of the module 16 is divided into two independent legends as shown in FIG. 1. Thus, display 38 is capable of simultaneously displaying two variables. The variables to be displayed are selected by operating the pushbutton actuated switches 40, 42, 44 and 46 in a predetermined sequence. The variables which may be displayed by the modules 16 include time of day, elapsed running time, distance traversed and average time per unit of distance. Time of day is displayed in units of hours, minutes and seconds. Distance measurements may be displayed in units of miles or kilometers.

The pushbutton switches 40, 42, 44 and 46 also provide additional logic functions. They are used to set the time of day and they are also used to select the elapsed time mode and to select the distance calculating mode of operation of the electronic pedometer of the present invention. In addition, the switches 40, 42, 44 and 46 provide the capability of starting and stopping the accumulation of elapsed time and distance traversed. The switches 40, 42, 44 and 46 are also used to reset the elapsed time and distance traversed.

Figure 2:
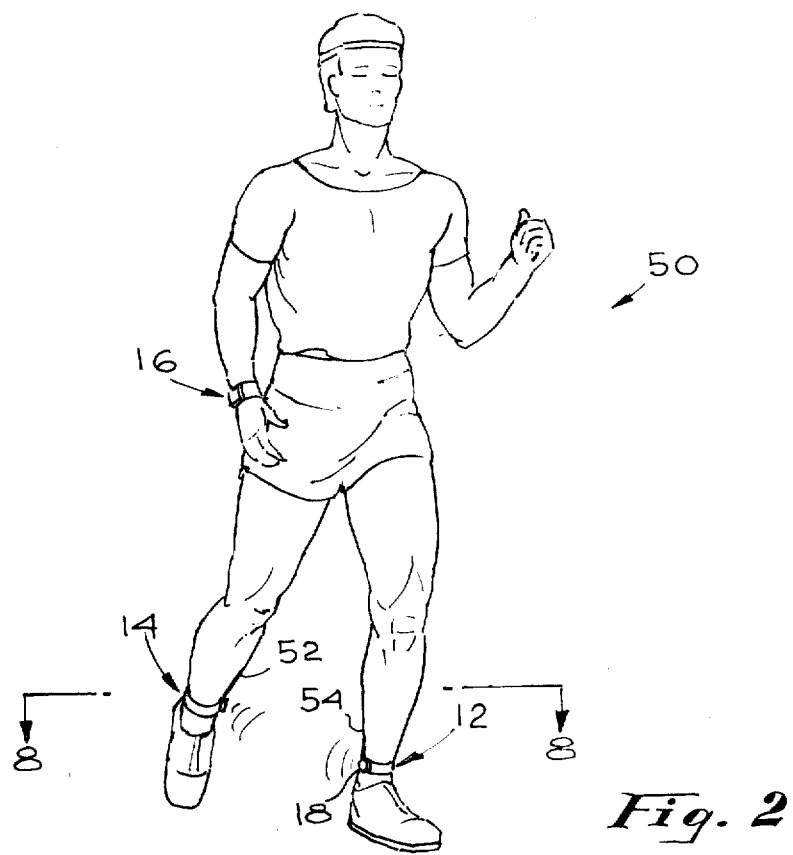
FIG. 2 is a perspective view showing a user wearing the electronic pedometer of the present invention.

Referring now to FIG. 2 there is shown a perspective view of a user 50 wearing the electronic pedometer of the present invention. As shown in FIG. 2, the ultrasonic generator module 12 is mounted to the left leg 54 of the user 50 by means of the adjustable strap 20. The module 12 is positioned so that the housing 18 containing the ultrasonic transducer faces the opposing or right leg 52. Similarly, the ultrasonic detector module 14 is strapped to the right leg 54 by means of the strap 28. The module 14 is oriented so that the housing 26 faces the opposing or left leg 52. Thus when the user's legs 52 and 54 are adjacent each other, the ultrasonic transducer and ultrasonic microphone mounted in modules 12 and 14, respectively, are facing each other. Also shown in FIG. 2 is the processor and display module 16 mounted to the wrist of the user 50 in the same manner as a wristwatch.

Figure 3:
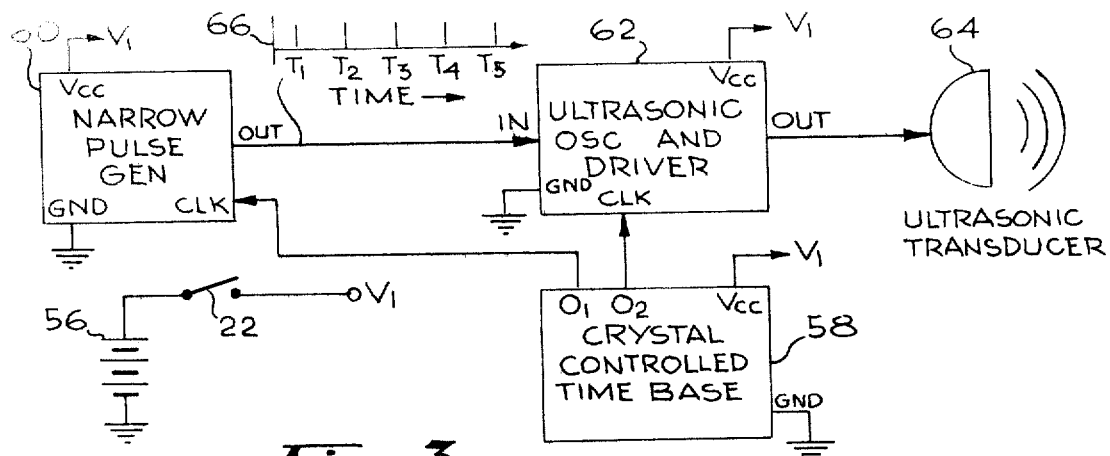
FIG. 3 is a block diagram illustrating the structure and operation of the generator module of the present invention.

Referring now to FIG. 3 there is shown a block diagram illustrating the operation of the electronic circuitry within the generator module 12 of the present invention. Included within the generator module 12 is a battery power source 56, a crystal controlled time base 58, a narrow pulse generator 60, an ultrasonic oscillator and driver 62 and an ultrasonic transducer 64. The crystal controlled time base 58 includes a quartz crystal frequency standard and a series of frequency dividers to produce highly accurate clock signals at the output terminals $O_1$ and $O_2$ of the time base 58. The output terminal $O_1$ of time base 58 is connected to the clock input terminal CLK of the pulse generator 60. The pulse generator 60 is configured to produce a pulse train signal at the output terminal of the generator 60 which consists of equally spaced narrow pulses shown as signal 66 in FIG. 3. In the preferred embodiment the pulses are spaced precisely thirty milliseconds apart and each pulse has a width of four hundred microseconds.

The output terminal of the pulse generator 60 is connected to the input terminal IN of the oscillator and driver 62. The output terminal $O_2$ of the time base 58 is connected to the clock input terminal CLK of the oscillator and driver 62. The oscillator and driver 62 is designed to produce an ultrasonic waveform at its output terminal OUT in response to a pulse appearing at the input terminal IN of the oscillator and driver 62. The output terminal OUT of the oscillator and driver 62 is in turn connected to drive the ultrasonic transducer 64. The transducer 64 generates ultrasonic energy in response to the output signal from the oscillator 62. This ultrasonic energy radiates from the front surface of the housing 18 of the generator module 12 as shown in FIG. 1. In the preferred embodiment the frequency of the ultrasonic oscillator is 40 kilohertz.

The time base 58, the pulse generator 60 and the oscillator and driver 62 all receive their operating voltage $V_1$ at their terminals $V_{CC}$ and GND respectively. The operating voltage $V_1$ is supplied from the battery source 56 whenever the switch 22 is closed. Operation of the circuit of the generator module 12 thus described is as follows.

After the user straps the ultrasonic generator module 12 to one leg, the user actuates the switch 22 providing power to the electronic circuitry shown in FIG. 3. The crystal controlled time base 58 provides clock signals to both the pulse generator 60 and the oscillator and driver 62. The pulse generator 60 generates the output signal 66 shown in FIG. 3. The signal 66 consists of a continuous series of narrow pulses occurring at the points in time $T_1$, $T_2$, $T_3$, $T_4$, $T_5$, etc. In the preferred embodiment, the time between pulses is thirty milliseconds. Therefore, $T_1$ represents thirty milliseconds, $T_2$ represents sixty milliseconds, $T_3$ represents ninety milliseconds, etc.. As each pulse is generated by the pulse generator 60, a corresponding pulse of ultrasonic energy is produced by the transducer 64. Thus the transducer 64 radiates ultrasonic pulses which also occur every thirty milliseconds.

The interpulse spacing within the signal 66 is accurately controlled by the crystal controlled time base 58. The ultrasonic generator module 12 continues to radiate pulses of ultrasonic energy as long as the switch 22 is closed. The transducer 64 is configured so that it radiates a generally hemispheric pattern of ultrasonic energy from its surface.

Figure 4:
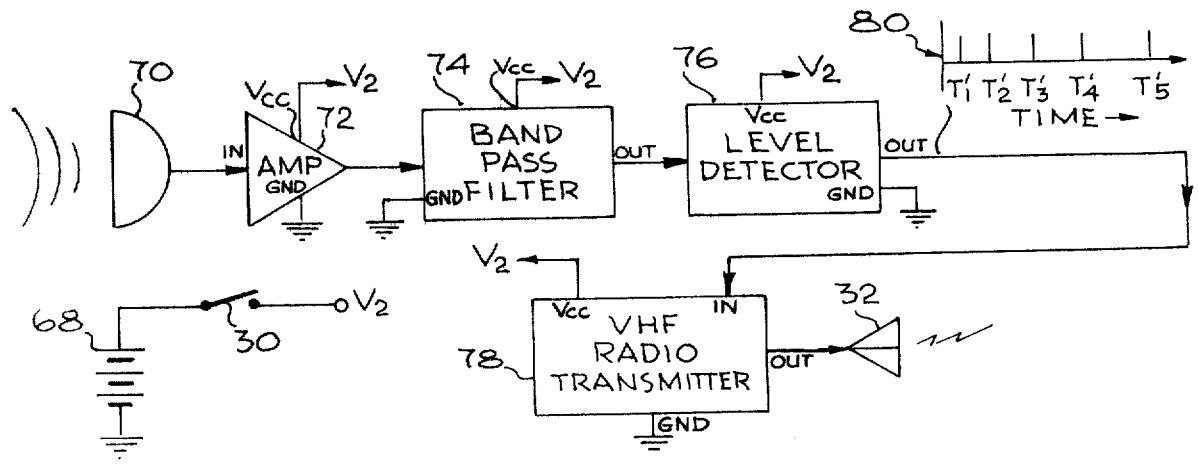
FIG. 4 is a block diagram illustrating the structure and operation of the detector module of the present invention.

Referring now to FIG. 4 there is shown a block diagram illustrating the operation of the detector module 14 of the present invention. As shown in FIG. 4 the circuitry of the detector module 14 includes a battery power source 68 which supplies power to a terminal $V_2$ via the switch 30. Also shown in FIG. 4 is an ultrasonic microphone 70, the output of which is amplified by amplifier 72. The output terminal of the amplifier 72 is connected to the input terminal of a band pass filter 74. The output terminal of the filter 74 is connected to the input terminal of a voltage level detector 76. The output terminal of the level detector 76 is in turn connected to the input terminal of a VHF radio transmitter 78. The radio transmitter 78 is designed to transmit data via the antenna 32 to the processing and display module 16 as described below. Operation of the electronic circuitry of the ultrasonic detector module 14 thus described is as follows.

The user straps the ultrasonic detector module 14 to one leg and actuates the power switch 30. As shown in FIG. 4, actuation of switch 30 provides voltage to terminal $V_2$ from power source 68. Terminal $V_2$ supplies operating voltage to the $V_{CC}$ and GND terminals of the amplifier 72, filter 74, detector 76 and transmitter 78. The ultrasonic microphone 70 responds to the pulses of ultrasonic energy being generated by transducer 64 strapped to the opposing leg. The microphone 70 generates an output signal in response to the ultrasonic energy. This output signal is amplified by amplifier 72. The filter 74 is used to eliminate transient noise and spurious signals from the signal generated by microphone 70. The band pass filter 74 is designed to have a center frequency of 40 kilohertz corresponding to the frequency of ultrasonic energy emitted by the transducer 64. The level detector 76 is designed to produce an output voltage pulse each time the microphone 70 detects a pulse of ultrasonic energy from the transducer 64. The signal appearing at the output terminal of the level detector 76 is thus a series of pulses shown as signal 80 in FIG. 4. The pulses shown in the signal 80 occur at the times $T_1'$, $T_2'$, $T_3'$, $T_4'$, $T_5'$, etc. which correspond to the detection of the ultrasonic pulses generated at the times $T_1$, $T_2$, $T_3$, $T_4$, $T_5$, etc., respectively. The pulses appearing at the output terminal of the level detector 76 are transmitted via the transmitter 78 and antenna 32 to the processor and display module 16.

Figure 5:
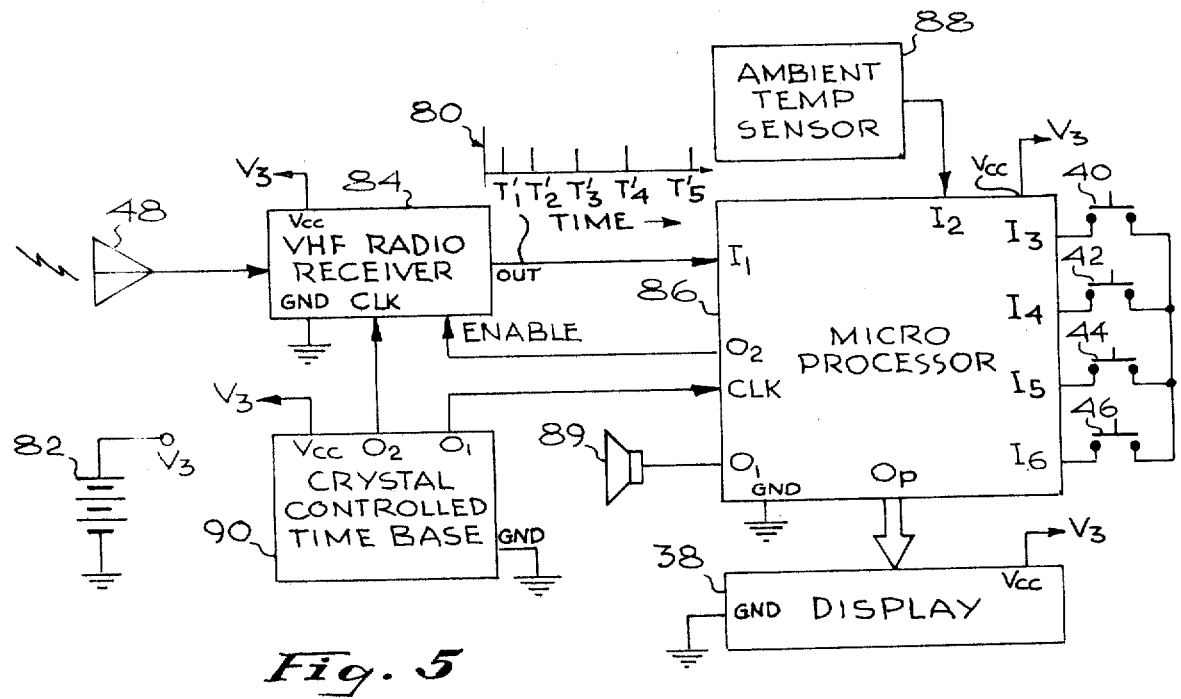
FIG. 5 is a block diagram illustrating the structure and operation of the processor and display module of the present invention.

Referring now to FIG. 5 there is shown a block diagram illustrating the operation of the electronic circuitry within the processor and display module 16 of the present invention. The circuitry shown in FIG. 5 includes a battery power source 82 connected to a terminal $V_3$. Also shown is a VHF radio receiver 84 and the antenna 48 for receiving the signals transmitted by the transmitter 78. The output terminal of the receiver 84 is connected to input terminal $I_1$ of a microprocessor 86. The microprocessor 86 provides all of the logic and arithmetic functions required to calculate and display the various outputs of the electronic pedometer of the present invention. Input signals to the microprocessor 86 include a signal from an ambient temperature sensor 88. The output terminal of the sensor 88 is connected to input terminal $I_2$ of microprocessor 86. The sensor 88 is used to compensate for temperature variations in the speed of sound as described below.

The pushbutton actuated switches 40, 42, 44 and 46 are connected to input terminals $I_3$, $I_4$, $I_5$ and $I_6$ respectively of microprocessor 86. As described above, actuation of the pushbuttons 40, 42, 44 and 46 determines the mode of operation of the electronic pedometer and also provides the start, stop and reset functions. Output terminals $O_1$ of a crystal controlled time base 90 is connected to the clock input terminal CLK of microprocessor 86. The time base 90 is similar to the time base 58 described above for the ultrasonic generator module 12. As shown in FIG. 3, the output terminal $O_2$ of the time base 90 is connected to the clock input terminal CLK of the receiver 84. The time base 90 is used also to supply timing reference signals to the microprocessor 86. The time base 90 is also used to stabilize the frequency of the receiver 84 in a manner well known to those skilled in the art.

Microprocessor 86 generates a variety of output signals as follows. Output terminal $O_1$ is connected to a speaker 89 which is used to generate a variety of audio tones. Output port $O_p$ of microprocessor 86 is connected to drive the display 38 of the processor and display module 16. The display 38, the receiver 84, the microprocessor 86 and the time base 90 all receive continuous operating power at their respective $V_{CC}$ and GND terminals from the battery power source 82. The overall operation of the electronic pedometer of the present invention as described above and illustrated in FIGS. 2, 3, 4 and 5 is as follows.

Referring to FIGS. 2, 3 and 4, in combination, it can be seen that the transducer 64 of the generator module 12 emits pulses of ultrasonic energy which radiate from the module 12 mounted to the user's left leg 54, as shown in FIG. 2. These ultrasonic pulses occur repetitively at precisely spaced time intervals as shown in the signal 66 of FIG. 3. Similarly, the ultrasonic microphone 70 of the detector module 14 detects the ultrasonic pulses emitted by transducer 64. The detected pulses of ultrasonic energy are converted into the pulse train shown in the signal 80 in FIG. 4. The timing data contained in the signal 66 and the signal 80 may be used to calculate distance between the ultrasonic transducer 64 and the ultrasonic microphone 70 in the following manner.

The distance between the transducer 64 and the microphone 70 is determined by measuring the delay between the time at which a pulse of ultrasonic energy is generated by transducer 64 and the time at which that pulse of ultrasonic energy is detected by microphone 70. Referring to signal 66 in FIG. 3, the times $T_1$, $T_2$, $T_3$, etc. represent the time at which each ultrasonic pulse is generated. Referring to signal 80 in FIG. 4, $T'_1$, $T'_2$, $T'_3$, etc. represent the times at which these ultrasonic pulses are detected by the microphone 70. Therefore, the difference in time between $T_1$ and $T'_1$ represents the delay between generation and detection of an ultrasonic pulse. Similarly, the interval between time $T_2$ and $T'_2$ represents the delay in receipt of the pulse generated at time $T_2$. The time interval described above is related to the distance between the transducer 64 and the microphone 70 by the speed of sound. Since the nominal speed of sound is eleven hundred feet per second, each millisecond of delay time represents a distance of 13.2 inches between transducer 64 and microphone 70.

As shown in FIG. 2, the distance between the transducer 64 and the microphone 70 represents the distance between the legs of the user. Hence, by generating ultrasonic pulses at a sufficiently high rate and measuring the corresponding delay of receipt of these pulses, the distance between the user's feet as a function of time may be determined.

FIG. 6 is a graphic illustration of the distance as a function of time between the legs of a user who is jogging or running. It can be seen that during each step the distance increases to a maximum value as the user steps forward. As the rear foot is brought forward, the distance between legs decreases to a minimum value corresponding to the point where the legs are adjacent. The cycle is then repeated for the next stride. The peak distance at each cycle of the waveform represents the stride length. In the illustration of FIG. 6 this distance is shown as two feet. By measuring and summing the individual stride lengths, the total distance traveled by the user may be computed.

As described above, the microprocessor 86 within the processor and display module 16 is used to perform the necessary calculations for determing distance traveled. One method we have devised for performing this distance calculation is to provide the signals 66 and 80 as inputs to the microprocessor 86, which in turn are programmed to calculate the delay time between the respective pulses of these two signals. However, this method requires that signals be provided to the processor module 16 from both the generator moldule 12 and the detector module 14. In the preferred embodiment of the electronic pedometer of the present invention, a unique mechanization is provided within the microprocessor 86. As shown below, by using this mechanization the only external signal required by the processor module 16 is the signal 80 from the detector module 14. The signal 80 is transmitted via a transmitter 78 and antenna 32 to the processor and display module 16 where it is received via antenna 48 and radio receiver 84. The signal 80 is provided to input terminal $I_1$ of the microprocessor 86 from the output terminal of the receiver 84. A radio transmitter and receiver system is used to eliminate the need for wires between the user's leg and the user's wrist.

The mechanization within the microprocessor 86 is used to derive the pulse timing data of the signal 66 from the information contained in the signal 80. This mechanization thus eliminates the need to provide a data link between the generator module 12 and the processor module 16. The preferred embodiment greatly simplifies the construction and minimizes the power consumption requirements of the electronic pedometer.

The microprocessor 86 is able to derive the pulse timing data of signal 66 from the information contained in signal 80 in the following manner. Both the generator module 12 and the processor and display module 16 contain crystal controlled time bases 58 and 90, respectively. Signal 66 is created from the timing signals derived from output $O_1$ of time base 58. As described above, the pulses in signal 66 occur at precisely thirty millisecond intervals corresponding to the times $T_1$, $T_2$, $T_3$, $T_4$, etc.. Similarly, crystal controlled time base 90 provides clock signals to the CLK input terminal of microprocessor 86 from output $O_1$ of time base 90.

It is well known to those skilled in the art that two crystal controlled time bases such as time base 58 and time base 90 may be constructed to that their relative timing accuracy may be held to within 100 parts per million or better. Thus the microprocessor 86 can be programmed to internally generate a reference pulse train having an interpulse spacing of thirty millisecond which closely matches the interpulse spacings of the signal 66. To complete the derivation of the timing data within the signal 66, it remains to properly synchronize the phase of the reference pulse train within microprocessor 86 to correspond with the phase of the pulses in the signal 66. This time of occurrence may be determined from the pulses in signal 80 as follows.

Referring again to FIG. 6 it can be seen that the distance between a user's feet as a function of time results in a waveform consisting of segments having a maximum point and a minimum point for each step taken by the user. In each case the maximum distance represents the user's stride distance and the minimum distance represents the point at which the user's legs are adjacent each other. The dots shown on the curve of FIG. 6 represent the points at which ultrasonic pulses are detected by the detector module 14 in response to the pulses generated by module 12. The horizontal axis of FIG. 6 is labeled at the points in time $T'_1$, $T'_2$, $T'_3$, etc.. These points in time correspond to the occurrence of pulses in signal 80 in response to the direction of ultrasonic energy. As described above, the times $T'_1$, $T'_2$, $T'_3$, etc., of pulses in signal 80 are delayed in time from the corresponding pulses $T_1$, $T_2$, $T_3$, etc., in the signal 66 by an amount proportional to the distance between the user's legs. Accordingly, this time delay will be at a minimum when the user's legs are adjacent each other. As shown in FIG. 6, this minimum time delay occurs at the times $T'_{11}$ and $T'_{22}$. Accordingly, the times of occurrences of the pulses at $T'_{11}$ and $T'_{22}$ closely correspond to the time of occurrence of the pulses $T_{11}$ and $T_{22}$ of the signal 66 as generated by module 12. Thus the times $T'_{11}$ and $T'_{22}$ can be assumed to be in phase and sychronized with the corresponding pulses $T_{11}$ and $T_{22}$ of the waveform 66 within reasonable bounds of accuracy.

From the above discussion it can be seen that the signals 66 and 80 may be assumed to be in phase when the user's legs are adjacent each other, as represented by minimum distance points in FIG. 6. Thus, if the reference pulse train generated within the microprocessor 86 is synchronized to the time $T'_{11}$ or $T'_{22}$, this reference pulse train will be closely synchronized to the pulse train of signal 66.

Referring now to FIG. 7, there is shown a table which lists the values of the points in time $T'_1$, $T'_2$, $T'_3$, etc., of occurrence of each of the pulses shown as dots in FIG. 6. This table of time values is based on a thirty millisecond interpulse spacing for the signal 66, and a value of eleven hundred feet per second for the speed of sound. Thus, generator module 12 emits an ultrasonic pulse every thirty milliseconds. For each foot of distance between the user's legs there is a delay of nine tenths of a millisecond before this ultrasonic pulse is detected by detector module 14. The time values listed in FIG. 7 correspond to the distance between the user's legs as shown in FIG. 6.

Mathematical analysis of the time intervals between adjacent pulses of waveform 80 show that the time interval between the two pulses just prior to the point of minimum distance between user's legs will be less than the interpulse spacing of the signal 66 (thirty milliseconds). Additionally, the time interval between the two pulses occurring just after the point of minimum distance between user's legs will be greater than the interpulse spacing of the signal 66. This mathematical relationship may be seen by referring to the table of time values shown in FIG. 7. The interval between time $T'_{11}$ and $T'_{10}$ is less than thirty milliseconds, and the interval between time $T'_{12}$ and $T'_{11}$ is greater than thirty milliseconds. This same relationship is true of the intervals between the time $T'_{22}$ and $T'_{21}$ and $T'_{22}$ and $T'_{23}$, respectively. Thus the times $T_{11}$ and $T_{22}$ are established as representing minimum distances as shown in FIG. 6. The above described mathematical relationship between time intervals occur only at those points which represent minimum distance between user's legs.

From the above discussion it can be seen that the microprocessor 86 may be programmed to provide a waveform that is nearly in phase with and synchronized to the signal 66 by using the data contained in the signal 80. When this phase relationship has been established, the time difference between the pulses appearing in the signal 80 and the pulses appearing in the signal 66 may be calculated. As described above, this time difference represents the distance between the user's legs. The microprocessor 86 is programmed to determine the maximum distance of each step taken by the user. For example, these maximum distances occur at the times $T'_5$ and $T'_{16}$ as shown in FIG. 6. These maximum distances represent the user's stride length. By summing the individual stride lengths, the microprocessor 86 determines the total distance traveled by the user. This total distance is then displayed on display 38.

The microprocessor 86 is also programmed to compensate for errors in calculating the stride length and distance traversed. One compensation routine adjusts for the fact that the user may be jogging in place. In this event, it has been found that the user's spacings are typically less than eight inches, as opposed to much longer stride lengths when the user is moving forward. Accordingly, the microprocessor 86 is programmed to ignore measured stride lengths less than eight inches.

Another compensation routine adjusts for changes in the value of the speed of sound as a function of the ambient temperature. As described above, the speed of sound is used to calculate the distance between the user's legs. A nominal value of eleven hundred feet per second is stored within the microprocessor 86, corresponding to the speed of sound at 20° C. As shown in FIG. 5, the output of the ambient temperature sensor 88 is connected to the input terminal $I_2$ of the microprocessor 86. The ambient sensor 88 may be in the form of a thermistor or other type of solid state temperature sensor which produces an output signal in proportion to the ambient temperature. This output signal is used by the microprocessor 86 to vary the calculated value of distance traveled to correct for ambient temperature variations.

The microprocessor 86 is also programmed to compensate for the error in leg-to-leg distance measurements caused by the spacing between adjacent legs as shown in FIG. 8. FIG. 8 is a cross sectional view of the runner's legs showing the various interleg spacings. As described above, the electronic pedometer of the present invention is designed to measure the spacing between the ultrasonic generator module 12 and the ultrasonic detector module 14. As shown in FIG. 8, this distance is $L_1$. However, as described above, the microprocessor 86 derives its timing reference for purposes of distance calculation from the points of minimum spacing of the user's legs. As shown in FIG. 8, this minimum interleg spacing is the distance $L_3$ between adjacent legs 52 and 54. Thus, in fact, the zero distance reference for the microprocessor 86 is the distance $L_3$. As a result, the distance as computed by the microprocessor 86 is the distance $L_1$ minus the distance $L_3$.

In calculating the distance traversed by the runner, it is desirable to measure the distance along an axis parallel to the direction of travel of the runner. This distance is shown as $L_2$ in FIG. 8. The distance $L_2$ is geometrically related to the distance $L_1$ by the distance $L_3$. $L_2$ is thus equal to the square root of $L_1$ squared minus $L_3$ squared. It has been found that the distance $L_3$ is relatively constant from user to user. In light of the foregoing discussion and for the typical stride lengths of interest, it has been found that the distance $L_2$ may be approximated by adding a constant factor to the measured stride distance $L_1-L_3$ for each stride taken by the user. In the preferred embodiment a distance of two inches is added to each measured stride distance to compensate for the errors caused by the distance $L_3$.

The microprocessor 86 is also programmed to compensate for the conditon where the user traverses a distance in excess of his stride length. This phenomenon occurs when the user is running or jogging at a relatively high velocity. Under this condition, both of the user's feet are clear of the ground at the same time, resulting in a leap as opposed to a step. The result is that the user transverses a greater distance during the leap than the distance between his legs would indicate. It has been found that the greater the velocity and stride length of the runner, the greater the leaping distance traversed. In the preferred embodiment, the microprocessor 86 computes and runner velocity by dividing the distance traversed by the time required to cover that distance. A leaping compensation factor is then determined from a lookup table stored within the memory of the microprocessor 86. The lookup table contains a set of stored values of leaping distance as a function of runner velocity and stride frequency. This leaping distance is then added to stride length to compensate for the additional distance traversed during a leap.

As described above, the microprocessor 86 performs the function of determining the uncompensated stride distance of the user and compensating this distance measurement for jogging in place, temperature variations, leg-to-leg spacing and leaping. The microprocessor 86 sums the compensated stride lengths to determine the overall distance traversed. The internal time-keeping functions of the microprocessor 86 are used to monitor the time required to traverse the distance. Distance calculations may be converted to units of miles or kilometers. Thus, the electronic pedometer of the present invention can display the distance traversed in miles or kilometers and the time per unit distance in minutes and seconds per mile or kilometer.

Figure 9:
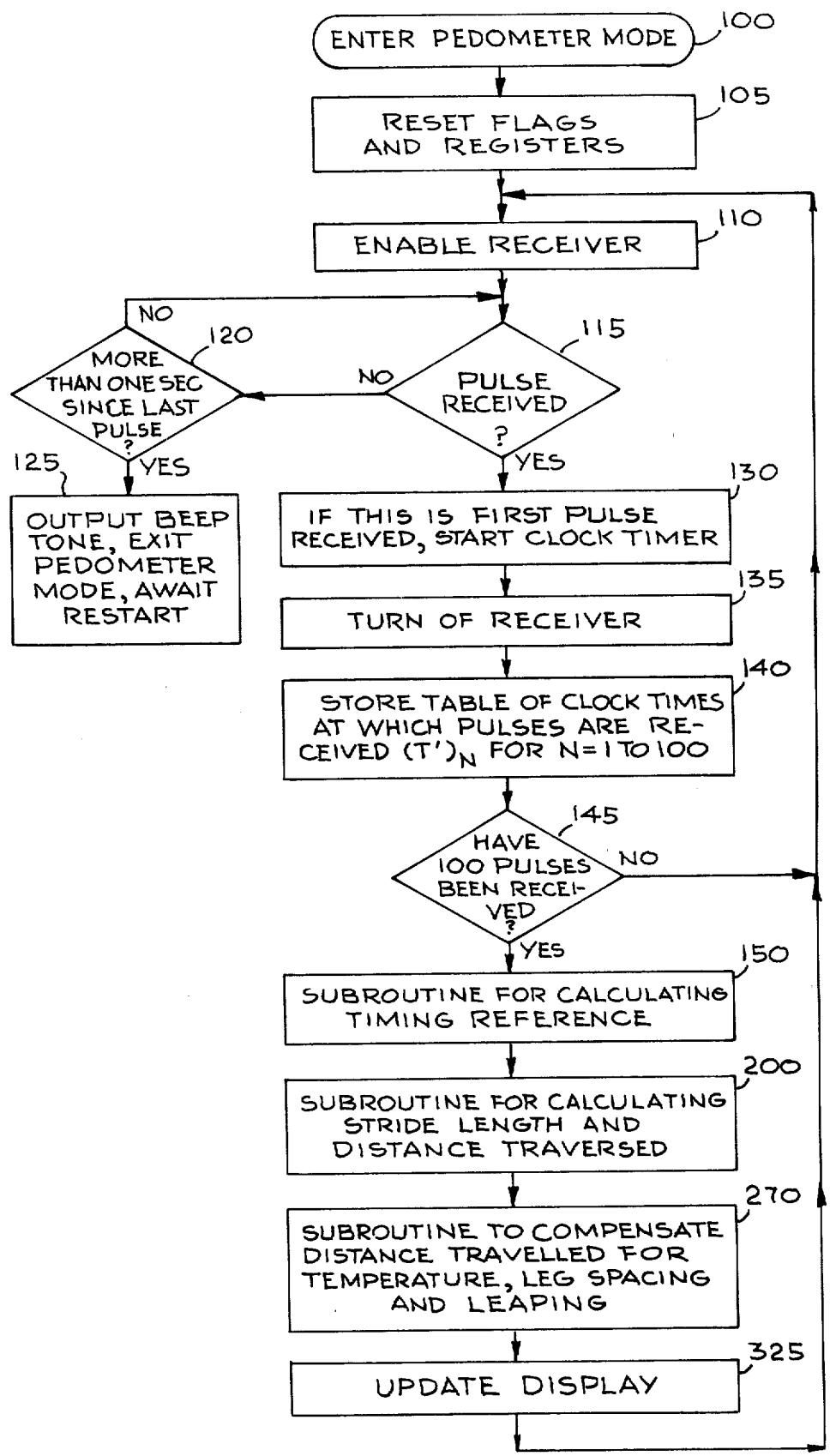
FIGS. 9-12 are flow charts showing the program and operation of the preferred embodiment of the present invention.

Referring now to FIGS. 9-12 there is shown a series of flow charts which illustrate the operation of the microprocessor 86 in determining the distance traversed by a runner using the electronic pedometer of the present invention. In FIG. 9 there is shown an overall flow chart showing the steps taken by the microprocessor 86 in determining the distance traveled by the user. The program begins at step 100 when the microprocessor 86 is commanded to enter the pedometer mode. As described above, the user enters the pedometer mode by depressing the appropriate pushbutton actuated switches 40, 42, 44 and 46 in a predetermined sequence. At step 105, the program resets all the flags and registers. At step 110, the program enables the VHF radio receiver 84. As shown in FIG. 5 this is accomplished by a signal appearing at the output terminal $O_2$ of microprocessor 86. At this point it is assumed that the user has already properly mounted and energized the ultrasonic generator and detector modules 12 and 14 respectively. Returning to FIG. 9 at step 115, the program looks to see if a pulse has been received by the receiver 84 from the transmitter 78.

If no pulse has been received, the program moves to step 120 to determine if one second has passed since the last pulse was received. One second is chosen as a time interval which is sufficiently long to allow several pulses to be received under normal conditions. Thus, if more than one second has passed since the last pulse, a malfunction of the generator or detector modules 12 and 14 is indicated. For example, improper mounting of the modules 12 and 14 or failure to actuate the power switches 22 and 30 would result in no pulses being received. If this is the condition, the program moves from step 120 to step 125 where a warning beep tone is output from the speaker 89 mounted within the display and processor module 16. The program then exits the pedometer mode and awaits restart by the user. Returning to step 120, if less than one second has passed since the last pulse, the program returns to step 15 and awaits receipt of the next pulse.

When a pulse has been received, the program moves to step 130. If this is the first pulse received since entering the pedometer mode, the microprocessor 86 starts an internal clock timer. As described below, this time will represent a reference time from which distance measurements will be indirectly calculated. At step 135 the receiver is turned off to conserve battery power. The receiver 84 can be turned off between pulses since it is known that the pulses will occur at approximately thirty millisecond intervals as generated by the ultrasonic generator module 12. At step 140, the program stores the time of receipt of each pulse. This time is referenced to the clock timer which was initiated at step 130. The time of occurrence for each pulse is $(T')_N$, the first pulse occurring at time $T'_1$. The program also counts the number of pulses received (N). At step 145, if fewer than one hundred pulses have been received, the program returns to step 110 and enables the receiver 84 to receive additional pulses. When one hundred pulses have been received, the program moves from step 145 to a subroutine at step 150 which is used for calculating the timing reference. At this point, the program has stored the times of occurrence of pulses $T'_1$ through $T'_{100}$ in a table similar to that shown in FIG. 7 and described above. These pulses represent the signal 80 as shown in FIG. 5. To calculate the distance between the user's legs, it is necessary for the program to generate a timing reference signal which is synchronized with pulses in the signal 66. This is accomplished within the subroutine 150 as shown in FIG. 10.

Figure 10:
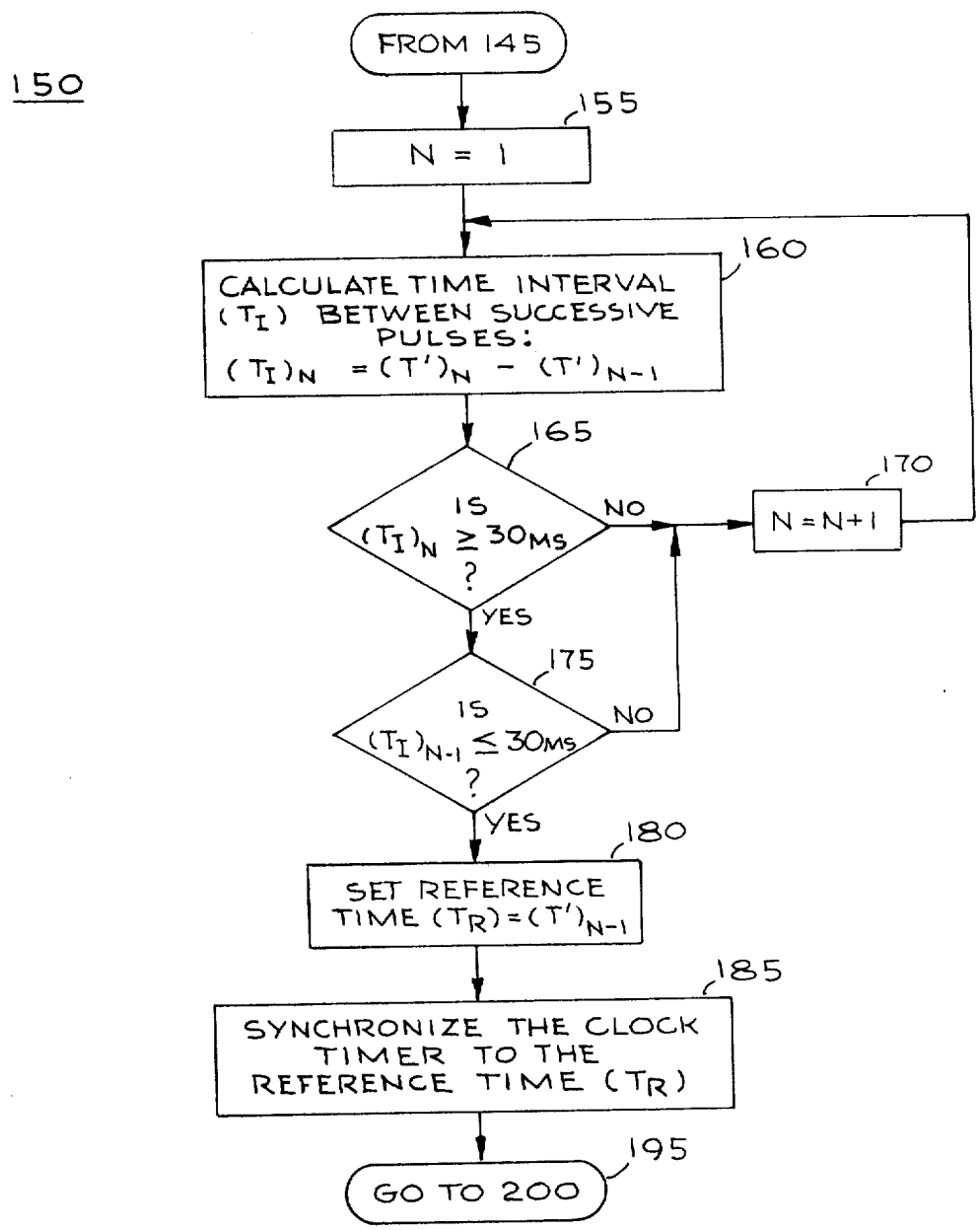

Referring to FIG. 10 there is shown the subroutine 150 for calculating the timing reference. The subroutine 150 begins at step 155 where the pulse number N is initialized to one. At step 160 the program calculates the time interval $T_I$ between the successive pulses. This time interval is computed by subtracting the time of occurrence of a pulse from the time of occurrence of the previous pulse. The times of occurrence of these pulses were stored in a table at step 140 as described above. As each time interval $T_I$ is calculated, the program moves to step 165 to determine if this time interval is greater than or equal to thirty milliseconds. If this is not the case, the program moves to step 170 where the pulse number N is incremented by one. The program then returns to step 160 to calculate the time interval between the next successive pulses. When a time interval $T_I$ is encountered which is greater than or equal to thirty milliseconds, the program moves from step 165 to step 175. At step 175, the program determines if the previous time interval is less than or equal to thirty milliseconds. If this is not the case, the program again moves to step 170 incrementing the pulse number N and calculating successive time intervals at step 160.

If at step 175 it is determined that the previous time interval is less than or equal to thirty milliseconds, the program moves to step 180. At this point the program has determined that the distance between the user's legs has reached a minimum such as shown at the times $T'_{11}$ and $T'_{22}$ in FIG. 6. As described above, the minimum distance point represents the condition when the user's legs 52 and 54 are adjacent each other. The time at which this minimum distance occurs may be considered coincident with the time of occurrence of a reference pulse of the signal 66. Thus, at step 180 a reference time $T_R$ is set equal to the time of occurrence of the minimum interleg distance. The program then moves to step 185 where the clock timer which was started at step 130 is synchronized to the reference time $T_R$. Accordingly, the program now has generated a timing reference which approximates the phase of the pulse of the signal 66.

Figure 11:
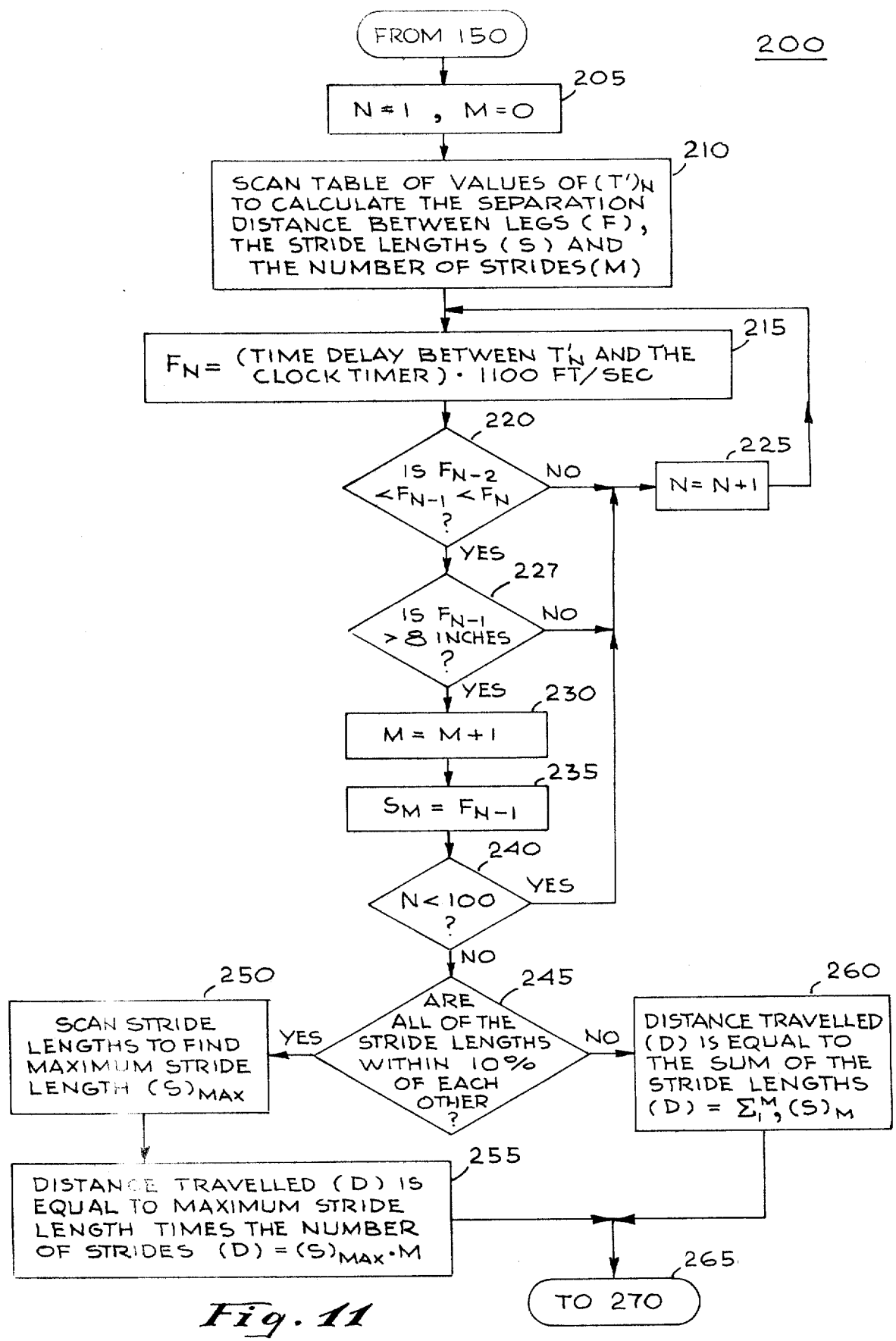

Step 200 represents a subroutine for calculating stride length. The steps comprising the subroutine 200 are shown in FIG. 11. The subroutine begins at step 205 where the counters for the pulse number N and for the number of strides M are initialized. At step 210 the program scans the table of one hundred values of T' to calculate the separation distance between the user's legs (F), the individual stride lengths (S) and the number of strides (M) taken by the user over the interval of one hundred pulses that have been received.

At step 215 shown in FIG. 11, the program mathematically computes the distance between the user's legs (F) for each value of pulse time T'. The equation shown within the step 215 accomplishes this distance calculation mathematically by calculating the time delay between the ultrasonic pulses emitted by the generator module 12 and the detection of these pulses by the detector module 14. This time delay is then multiplied by the speed of sound to yield a distance measurement. As described above, the values of $T'_n$ represent the points in time of the detection of pulses by the module 14. Similarly, the program clock timer has been synchronized to the pulses emitted by the generator module 12 in the subroutine 150. Thus, at step 215 the program calculates the separation distance between legs $(F_N)$ by calculating the time delay between $T'_n$ and the clock timer, and multiplying this time difference by a nominal value of the speed of sound (eleven hundred feet per second).

The equation in step 215 is used to calculate the separation distance of the user's legs (F) for each pulse received, resulting in a set of distance values corresponding to the dots shown on the curve of FIG. 6. The program then moves to step 220 where the values computed for the separation distance of the legs are examined to determine if they represent a maximum separation distance. A maximum value is determined by comparing that value to the previous separation distance and the following separation distance. If the value is not a maximum, the program increments the pulse number N at step 225 and continues calculating the separation distance $F_N$ for subsequent pulses at step 215. When a separation distance is detected as having a maximum value at step 220, the distance $F_{N-1}$ is the stride length. The program moves to step 227 to determine if the stride length $F_{N-1}$ is greater than eight inches. If it is not, the program assumes the runner is jogging in place. Accordingly, these stride lengths are ignored and the program returns to step 225 to calculate subsequent stride lengths. If the stride length $F_{N-1}$ is greater than eight inches the program moves to step 230

At step 230 the program increments the stride counter M. At step 235 the program stores the distance value $F_n-1$ in a stride length table $S_M$. Referring again to FIG. 6, it can be seen that a maximum stride length occurs for each step taken. Thus, a maximum distance occurs at time $T'_5$ for the first step and at time $T'_{16}$ for the following step. Returning to FIG. 11, at step 240 the program looks to see if all one hundred pulses have been processed by the subroutine 200. If they have not, the program increments the pulse counter N and continues the calculation of separation distance $F_N$, stride length S and the number of strides M until all one hundred pulses have been processed.

When all one hundred pulses have been processed, the program has stored a table of values $S_M$ for all of the stride lengths taken over these one hundred pulses. The program has also stored in M the total number of strides or steps taken. The program then moves to step 245 to calculate the total distance traveled during the time interval of the one hundred pulses. A method of determining the total distance traveled is to sum the individual stride lengths. However, in the preferred embodiment of the electronic pedometer of the present invention the microprocessor 86 is programmed to calculate total distance traveled by either of two separate methods.

The first method of determining distance traveled is simply to sum the individual stride lengths. This method is shown in step 260 in FIG. 11. At step 245 the program determines whether all of the stride lengths stored over the interval of one hundred pulses are within ten percent of each other in magnitude. If they are not, the program moves to step 260 where the individual stride lengths are summed together to arrive at the distance traveled D. If all of the stride lengths are within ten percent of each other, the program moves from step 245 to step 250 which is the second method of determining distance traveled.

At step 250, the individual stride lengths are scanned by the program to find the maximum stride length $S_{max}$. The program then moves to step 255 where the distance traveled D is computed by multiplying the maximum stride length $S_{max}$ by the total number of strides M. This second method of determining the distance traveled is used to achieve a more accurate distance measurement when the stride lengths are all approximately the same size. The rationale behind this second method of determining total distance traversed is based on sampling theory as follows.

Referring to FIG. 6 it can be seen that the spacing of thirty milliseconds between pulses generated by the ultrasonic generator module 12 results in sampling the distance between the user's legs at discrete points in time. This sampling rate was chosen for the preferred embodiment as being the lowest sampling rate practical while still maintaining a reasonably accurate sampling of each stride taken by the user. It is desirable to minimize the sampling rate to conserve battery power consumed by the generator module 12 and to minimize the number of storage and data registers required in the microprocessor 86. As a result of using a low sampling rate, the time of occurrence of maximum stride distance may not coincide with the occurrence of a sampling pulse. As shown in FIG. 6, the pulse occurring at time $T'_5$ coincides with the maximum stride distance of two feet for the first stride shown. For the second stride shown in FIG. 6 the pulses at the times $T'_{16}$ and $T'_{17}$ occur on either side of the maximum distance for that stride. Obviously, if a pulse does not occur at the peak of the stride distance, the distance measurement for that stride will be in error.

If, however, a large number of strides occur all having approximately the same stride length, a more accurate determination of stride length may be made by using the largest stride length over any of these strides. This determination is based on the fact that asynchronous sampling over a large number of nearly identical strides will eventually result in a sample occurring at the peak of at least one stride.

Returning now to step 245 in FIG. 11 based on the above discussion, the program branches to either step 260 or to steps 250 and 255 to compute the distance traveled. When distance traveled D has been computed, the program at step 265 returns to the main routine of FIG. 9 at step 270.

Figure 12:
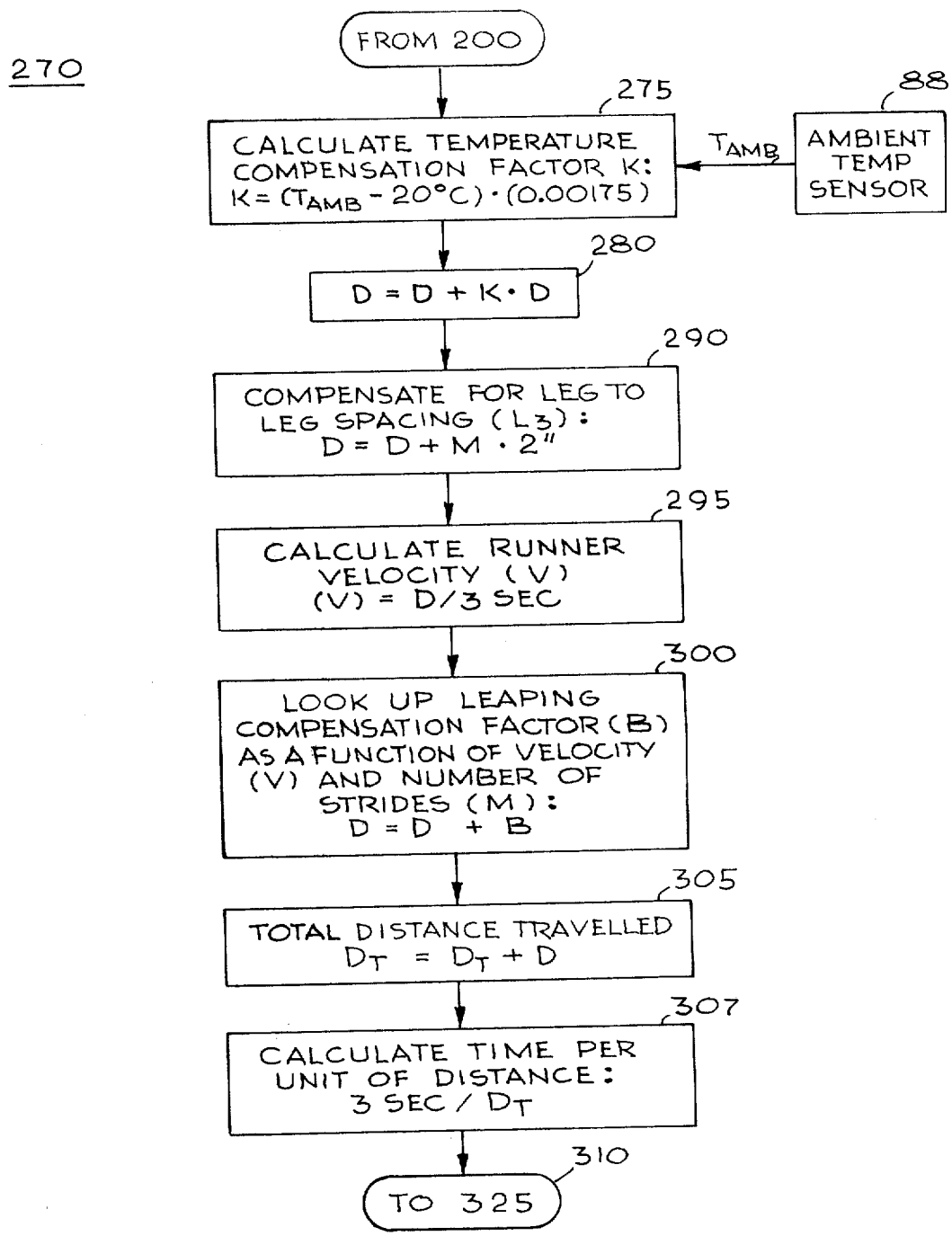

At this point in the program the variable D represents the uncompensated distance traveled by the user during the one hundred pulse interval of time. The program now moves to step 270 which represents a subroutine used to compensate the computed value of the distance traveled D for a variety of errors. The subroutine 270 compensates for changes in the speed of sound as a function of ambient temperature changes; for distance measuring errors caused by the spacing between adjacent legs of the user; and for distance measuring errors resulting from the user taking strides which include leaping. The steps comprising the subroutine 270 are shown in FIG. 12.

The subroutine 270 begins with temperature compensation at step 275. As described above, temperature compensation consists of adjusting the distance traveled to account for the fact that the speed of sound is a function of ambient temperature. At step 275 the program receives a signal which is proportional to ambient temperature ($T_{amb}$) from the output of the ambient temperature sensor 88 (see FIG. 5). At previous step 215 the uncompensated distance traveled was calculated using a value of eleven hundred feet per second for the speed of sound, which is a correct value at an ambient temperature of 20° C. The speed of sound varies at a rate of approximately 0.175% per degree C. Thus, at step 275 the program calculates a temperature compensation factor K based on the difference between the ambient temperature as measured by sensor 88 and the nominal temperature of 20° C. The program then moves to step 280 where the distance traveled D is compensated by adding a factor K times D to correct for the ambient temperature variations.

The program then moves to compensate for the angular measuring error caused by the distance between adjacent legs as shown in FIG. 8 and described above. At step 290, the distance traveled D is increased by two inches for every stride taken, as shown by the equation within the block 290. The program then moves to step 295 to compensate for leaping.

At step 295 the average runner velocity V is calculated by dividing distance D by three seconds. Three seconds represents the time interval over one hundred pulses, based on the pulse rate of one pulse every thirty milliseconds. At step 300 a leaping compensation factor B is added to the distance traveled. The compensation factor B is a function of the velocity V and the stride frequency as represented by the number of strides M.

Predetermined values of B are stored in a table as a function of V and M. The values stored in this table are determined experimentally by observing runners to determine the typical distances traversed by leaping at a variety of running speeds and stride frequencies. Finally, at step 305 the total distance traveled $D_T$ is computed by adding the individual distances D traversed over each group of one hundred pulses, as shown by the equation in step 305. The program moves at step 307 to calculate time per unit of distance by dividing the total distance traversed $D_T$ into the elapsed time of three seconds. The program at step 310 then returns to the main routine shown in FIG. 9 at step 325.

At step 325 the display is updated to show the total distance traveled $D_T$ as described above. Depending on the functions selected to be displayed, display 38 may be used to show distance traveled in units of miles or kilometers. The display 38 may also be used to display the time per mile or time per kilometer as well as the timekeeping and stopwatch functions described above. After the display is updated, the program returns to step 110 as shown in FIG. 9 to receive the next one hundred pulses and repeat the process of computing distance traveled.

As will be understood by those skilled in the art, many different programs may be utilized to implement the flow charts disclosed in FIGS. 9–12. Obviously, these programs will vary from one another in some degree. However, it is well within the skill of the art of the computer programmer to allow particular programs for implementing each of the steps of the flow charts disclosed herein.

While there has been shown and described a preferred embodiment of the present invention which measures the distance between a user's legs by means of acoustic waves, it is not intended that the invention be limited solely to this embodiment. For example, electromagnetic waves might be employed where the distance is measured by detecting either the time difference or frequency difference (Doppler effect) between the transmission and reception of the waves. It is therefore to be understood that because various other embodiments may be devised by those skilled in the art without departing from the spirit and scope of the invention, it is the intention of the inventors to be limited only by the claims appended hereto.

What is claimed is:

1. A pedometer comprising measurement means for measuring the actual distance between the user's legs during each step taken by the user, means responsive to the measurement means for determining the stride length for each step taken by the user, means for adding together the stride lengths over a plurality of steps, and means for displaying a sum of the stride lengths over the plurality of steps.

2. A pedometer comprising measurement means for measuring the maximum distance between the user's legs for each step taken by the user, means responsive to the measurement means for determining the stride length for each step taken by the user, means for adding together the stride lengths over a plurality of steps, and means for displaying a sum of the stride lengths over the plurality of steps, and in which the measurement means for measuring the maximum distance between the user's legs includes:
   means positioned on one leg of the user for emitting ultrasonic energy;
   means positioned on the other leg of the user for detecting the emitted ultrasonic energy; and
   means responsive to the means for detecting the emitted ultrasonic energy for determining the maximum distance between the user's legs.

3. The pedometer of claim 2 in which the means for measuring the maximum distance between the user's legs further includes:
   means for measuring a time delay between the time of emission and the time of detection of the ultrasonic energy;
   means for determining the maximum value of the time delay during each step taken by the user; and
   means for converting the maximum value of the time delay into a measurement of the maximum distance between the user's legs.

4. The pedometer of claim 2 in which the means for emitting ultrasonic energy includes:
   a first crystal controlled time base;
   a pulse generator synchronized by the first time base;
   an ultrasonic oscillator gated by the output of the pulse generator; and
   an ultrasonic transducer responsive to the output of the oscillator for producing pulses of ultrasonic energy.

5. The pedometer of claim 2 in which the means for detecting the emitted ultrasonic energy includes:
   an ultrasonic microphone;
   an amplifier connected to amplify the output of the microphone;
   a band pass filter connected to filter the output of the amplifier; and
   a voltage level detector responsive to the output of the filter for producing a voltage pulse in response to the detection of the emitted ultrasonic energy.

6. The pedometer of claim 3 in which the means for measuring a time delay includes:
   a microprocessor;
   means for relaying the time of detection of the ultrasonic energy to the microprocessor;
   a second crystal controlled time base connected to provide a clock signal to the microprocessor; and
   means for synchronizing the microprocessor to the time of emission of the ultrasonic energy.

7. The pedometer of claim 6 in which the means for relaying the time of detection of the ultrasonic energy includes a radio transmitter and a radio receiver responsive to the output signal of the transmitter.

8. The pedometer of claim 6 in which the means for synchronizing the microprocessor to the time of emission of the ultrasonic energy includes means for providing an algorithm to determine when the time of detection of the ultrasonic energy is coincident with the time at which the user's legs are adjacent each other.

9. The pedometer of claim 3 in which the means for converting the time delay measurement into a distance measurement includes means for determining ambient temperature, means for estimating the speed of sound as a function of the ambient temperature and means for estimating the distance traveled when the user takes a leaping step.

10. The pedometer of claim 1 which further includes means for calculating and displaying the duration of time required by the user to traverse a predetermined unit of distance.

11. The pedometer of claim 9 further including means for determining the velocity of the user, and in which the means for estimating the distance traveled when the user takes a leaping step is a function of the velocity of the user.

12. A pedometer comprising length of stride determining means carried by a user, including:
   sender means positioned on one leg of the user for sending a signal;
   responder means positioned on the other leg of the user for responding to the sender means;
   means responsive to the responder means for determining the stride length of the user; and means for adding together the stride lengths determined over a plurality of steps taken by the user.

13. The pedometer of claim 1 in which the means for determining the stride length includes means for estimating the transverse distance between the user's legs along an axis perpendicular to the direction of travel of the user, and means for combining the transverse distance with the actual distance to determine the stride length.

14. The pedometer of claim 1 in which the means for adding together the stride lengths includes means for providing a predetermined minimum stride length, and means for preventing the addition of a stride length if it is less than the predetermined minimum stride length.

15. The pedometer of claim 1 further including means for determining the velocity of the user, and means for altering the determined stride length as a function of the velocity.

* * * * *